United States Patent [19]

Nomura et al.

[11] Patent Number: 4,765,927

[45] Date of Patent: Aug. 23, 1988

[54] ANTIOXIDIZING COMPOSITION

[75] Inventors: Yukihiro Nomura, Nara; Yoko Okuda, Higashiosaka, both of Japan

[73] Assignee: House Food Industrial Company Limited, Higashiosaka, Japan

[21] Appl. No.: 893,887

[22] Filed: Aug. 6, 1986

[30] Foreign Application Priority Data

Aug. 12, 1985 [JP] Japan ............................ 60-177346

[51] Int. Cl.[4] ............................ C09K 15/32

[52] U.S. Cl. ............................ 252/400.2; 252/400.21; 426/545; 426/547; 260/398.5

[58] Field of Search ............................ 252/400.2, 400.21; 426/545, 547; 514/78, 458; 260/398.5

[56] References Cited

U.S. PATENT DOCUMENTS

| | | | |
|---|---|---|---|
| 2,333,655 | 11/1943 | Mattill | 260/398.5 X |
| 2,451,748 | 10/1948 | Kraybill et al. | 260/398.5 X |
| 2,494,114 | 1/1950 | Black | 260/398.5 |
| 2,607,745 | 8/1952 | Magoffin | 252/400.2 X |
| 2,677,616 | 4/1954 | Hall | 426/547 |
| 2,701,770 | 2/1955 | Kuhrt | 252/400.2 X |
| 2,707,154 | 4/1955 | Lehmann et al. | 252/400.2 X |
| 2,944,908 | 7/1960 | Knowles et al. | 252/400.2 X |
| 4,434,187 | 2/1984 | Chandler et al. | 252/400.2 X |

FOREIGN PATENT DOCUMENTS

| | | | |
|---|---|---|---|
| 559292 | 6/1958 | Canada | 252/400.2 |
| 71387 | 4/1984 | Japan | 426/545 |

OTHER PUBLICATIONS

"The Oxidative Deterioration of Food Lipids" (*Symposium of Foods; Lipids and Their Oxidation,* 1962).

Sherwin, E. R., "Oxidation and Antioxidants and Fat and Oil Processing", *J. Amer. Oil Chem. Soc.,* vol. 55 (1978), pp. 809–814.

Sherwin, E. R., "Antioxidants for Food Fats and Oils", *J. Amer. Oil. Chem. Soc.* vol. 49 (1972), pp. 468–472.

Tappel et al., "Unsaturated Lipid Peroxidation Catalyzed by Hematin Compounds and its Inhibition by Vitamin E", *J. Amer. Oil Chem. Soc.,* vol. 38 (1961), pp. 5–9.

Evans et al., "Tocopherol Oxidation in Fats, Hydrogenated Soybean Oil", *J. Amer. Oil Chem. Soc.,* vol. 36 (1959), pp. 73–77.

*Primary Examiner*—Matthew A. Thexton

*Attorney, Agent, or Firm*—Oblon, Fisher, Spivak, McClelland & Maier

[57] ABSTRACT

This invention relates to an antioxidizing composition which comprises an antioxidant such as tocopherol, BHT or BHA; condensed phosphate such as pentapolyphosphate; and citric acid. The antioxidizing composition has antioxidant action superior to conventional compositions and has good compatibility with fat, oil and food containing fat or oil. The antioxidizing composition preferably comprises tocopherol, lecithin, pentapolyphosphate and citric acid.

9 Claims, No Drawings

ANTIOXIDIZING COMPOSITION

BACKGROUND OF THE INVENTION (1) Field of the Invention

This invention relates to antioxidizing composition, in particular, an antioxidizing composition which is suitable for use in antioxidizing fat or oil.

(2) Prior Art

Materials present in the natural world are subject to many kinds of oxidant actions. Among materials, fats or oils are especially easily oxidized. In particular, when a fat or oil is oxidized in the process of preparation with heating or during storage, the fat or oil is degraded by production of peroxide, coloring, bad odor, etc.

Therefore, in order to prevent degrading by oxidation as described above, there have been used many kinds of antioxidants such as tocopherol, butylated hydroxytoluene (BHT), butylated hydroxyanisole (BHA), nordihydroguaiaretic acid (NDGA), ascorbic stearate, gallate and phospholipid such as lecithin and kephalin, but sufficient antioxidation effect has not been obtained yet. Furthermore, although the above well-known antioxidants are used with a kind of chelating agent such as a phosphate or citric acid, sufficient antioxidation effect has not yet been obtained thereby either.

SUMMARY OF THE INVENTION

Under such circumstances, the present invention has been accomplished on the basis of the discovery that when a well-known antioxidant is used with a condensed phosphate and citric acid, which are conventionally used as a synergist, the antioxidant action thus obtained is greatly increased compared with the case of using one of the synergists alone.

It is therefore the primary object of the present invention to provide an antioxidizing composition having antioxidant action superior to conventional antioxidizing compositions.

Another object of the present invention is to provide an antioxidizing composition which has good compatibility with fat, oil and foods containing these, and which can greatly reduce degradation of food casused by oxidation.

These and other objects will be clear from the following description.

In accordance with the present invention, there is provided an antioxidizing composition comprising at least one antioxidant, condensed phosphate and citric acid.

DESCRIPTION OF THE PREFERRED EMBODIMENT

A conventional antioxidant can be used as the antioxidant in the present invention. Examples of the antioxidant include tocopherol, BHT, BHA, NDGA, ascorbic stearate, gallate, lecithin, kephalin and the like. In case of use with food, it is preferable to use an antioxidant among those enumerated which is allowed as a food additive, eq. tocopherol, BHT, BHA etc. A phospholipid such as lecithin and kephalin can be preferably used too. These antioxidants can be used singly or in combination.

Examples of condensed phosphates useable in the present invention include pyrophosphate, acid pyrophosphate, tripolyphosphate, tetrapolyphosphate, pentapolyphosphate, metaphosphate, trimethaphosphate, tetrametaphosphate, ultrapolyphosphate and etc.

Among these condensed phosphates, it is preferable to use a polyphosphate having 4 to 5 phosphorous atoms in its molecule or metaphosphate, more preferably pentapolyphosphate (i.e., $Na_7P_5O_{16}$). As for these salts, there can be used many kinds of salts such as sodium salt, potassium salt, etc., sodium salt being preferable.

Citric acid useable in the present invention includes citric acid itself and partially neutralized citric acid in which carboxyl groups of citric acid are partially neutralized. As a rule, the food grade citric acid is used.

In the present invention, the use ratio of the well-known antioxidant, condensed phosphate and citric acid is optional, but it is preferable to use 3 to 1200 parts by weight of condensed phosphate and 0.6 to 50 parts by weight of citric acid relative to 100 parts by weight of antioxidant, more preferably 50 to 500 parts by weight of condensed phosphate and 10 to 25 parts by weight of citric acid.

In the present invention, furthermore, optional condensed phosphate and citric acid can be combined with one or not less than two kinds of antioxidant, but it is particularly preferable to combine pentapolyphosphate and citric acid with tocopherol from the point of heat stability, permeability against fat or oil, and antioxidant effect. It is also preferable to use pentapolyphosphate and citric acid together with a mixture of phospholipid and tocopherol having a ratio of 1/50 to 20/1. Most preferable composition of the present invention comprises 2 to 2000 parts by weight of lecithin, 5 to 1000 parts by weight of pentapolyphosphate and 2 to 50 parts by weight of citric acid relative to 100 parts by weight of tocopherol.

The antioxidizing composition of the present invention can be added to many materials in various ways.

Although the antioxidizing composition of the present invention can be used with many kinds of materials, the composition is preferably added to in particular, edible fat, edible oil or food materials containing fat or oil, for example, animal fat or oil such as beef tallow, lard, fish oil, whale oil; vegetable fat or oil such as soybean oil, corn oil, cotton seed oil, rice oil, sunflower oil, sesame oil, rape oil; butter, shortening oil, dressing, cheese, margarine, mayonnaise, ham, instant noodles, doughnuts, chocolate, cream and the like. The antioxidizing composition can also be preferably used for products containing fat or oil such as cosmetics, synthetic resin or the like, beside food. In case of adding the antioxidizing composition to fat or oil, the composition is preferably added to it in the amount of 0.01 to 0.2 part by weight relative to 100 parts by weight of fat or oil.

The present invention will be explained in connection with the following non-limitative examples.

EXAMPLE 1

Palm oil having an acid value of 0.05 and a peroxide value of 0.1 and not containing any antioxidant was used for test purposes, and many antioxidants or antioxidizing compositions as listed in Table 1 were added to 200 g samples of the palm oil to determine their respective antioxidant actions by the following method. Each palm oil sample to which the compositions listed in Table 1 were added was heated to a temperature of 180° C. in a heating pot. Assuming that food such as potato chips or instant noodles are fried, distilled water was added to the palm oil at the rate of 1 ml/minute during the heating. After the heating started, 10% by weight of the palm oil was taken therefore after each elapsed hour, the same amount of fresh palm oil was added to replenish the amount in the pot, and the heating was continued at a temperature of 180° C. As for the palm oil removed 8 hours after the heating had started, the degree of oxidation was measured by the active oxygen method (AOM).

AOM method

The 20 ml of palm oil thus sampled was weighed in a test tube. The test tube was put into an oil bath of 97.8° C. with fresh air being blown into the palm oil at the rat of 2.33 ml/second and then time in hours required for the POV (peroxide value) of the oil to reach 100 was measured. The results thus obtained are shown in Table 1.

In this experiments, commercial tocopherol containing 70% by weight of tocopherol was used and there were used reagent grade BHT and BHA, and food additive grade sodium pentapotyphosphate ($Na_7P_5O_{16}$), sodium tetrapolyphosphate ($Na_6P_4O_{13}$), sodium metaphosphate and citric acid. As for lecithin, there was used the product obtained by removing neutral lipid from acetone fraction of soybean lecithin according to the conventional method.

TABLE 1

| | Comparative example | | | | | | | | | | |
|---|---|---|---|---|---|---|---|---|---|---|---|
| | 1 | 2 | 3 | 4 | 5 | 6 | 7 | 8 | 9 | 10 | 11 |
| Composition (ppm) | | | | | | | | | | | |
| Tocopherol | 200 | | | | | | ← | ← | ← | ← | 200 |
| Lecithin | | 100 | | | | | 100 | | | | |
| Sodium pentapolyphosphate | | | 150 | | | | | 150 | | | |
| Sodium tetrapolyphosphate | | | | 150 | | | | | 150 | | |
| Sodium methaphosphate | | | | | 150 | | | | | 150 | |
| Citric acid | | | | | | 25 | | | | | 25 |
| Properties | | | | | | | | | | | |
| AOM value (hours) | 8 | 8.5 | 8.3 | 6.0 | 8.5 | 7.8 | 9.0 | 9.0 | 7.8 | 9.1 | 8.8 |
| Ratio* | 1.03 | 1.09 | 1.06 | 0.77 | 1.09 | 1.00 | 1.15 | 1.15 | 1.00 | 1.17 | 1.13 |

| | Example of the invention | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Composition (ppm) | | | | | | | | | | | | |
| Tocopherol | | 200 | → | → | → | → | → | → | → | → | → | → |
| Lecithin | | | | | | | 10 | 100 | 500 | 1000 | 100 | 100 |
| Sodium pentapolyphosphate | 50 | 150 | 300 | 500 | | | 150 | 150 | 150 | 150 | | |
| Sodium tetrapolyphosphate | | | | | 150 | | | | | | 150 | |
| Sodium methaphosphate | | | | | | 150 | | | | | | 150 |
| Citric acid | ← | ← | ← | ← | ← | 25 | → | → | → | → | → | → |
| Properties | | | | | | | | | | | | |
| AOM value (hours) | 12.0 | 15.0 | 14.2 | 13.6 | 11.1 | 11.9 | 16.5 | 19.5 | 42.0 | 70.0 | 11.7 | 12.5 |
| Ratio* | 1.54 | 1.92 | 1.82 | 1.94 | 1.42 | 1.52 | 2.12 | 2.50 | 5.38 | 8.97 | 1.50 | 1.60 |

*Ratio of AOM value of the sample to that of the oil containing no antioxidant.

As is obvious from Table-1, a small antioxidant action can be obtained by using one component (Nos. 1 to 6) or two components (Nos. 7 to 11) selected from tocopherol, lecithin, condensed phosphate and citric acid, good antioxidant action can be obtained by using three components (Nos. 12 to 17). Among the three-component combinations it is preferable to use tocopherol, sodium pentapolyphosphate and citric acid (Nos. 12 to 15). Furthermore, the antioxidant action is increased even more by using lecithin together with the above three components (Nos. 18 to 21).

EXAMPLE 2

The same experiment as set forth in Example 1 was conducted except that BHT or BHA was used instead of tocopherol, to measure antioxidant action. The results obtained were as follows:

AOM value was 10.5 in case of using BHA, sodium pentaphosphate and citric acid in a ratio of 200/150/25 ppm.

AOM value was 10.5 in case of using BHT, sodium pentaphosphate and citric acid in a ratio of 200/150/25 ppm.

As in obvious from the above description, the antioxidizing composition of the present invention has good antioxidant action for fat, oil and food containing them, in particular, against oxidation resulting from heating, i.e., when fat, oil or the food is heated to a hight temperature (e.g. in frying). The composition also has good safety and good compatibility with fat or oil, which are commonly added to food and the like. Furthermore, the composition of the present invention effectively works for non-aqueous system and aqueous system such as materials containing fat and/or oil and water.

What is claimed is:

1. An anti-oxidizing composition comprising a condensed phosphate, citric acid, and at least one antioxidant selected from the group consisting of tocopherol, BHT, BHA and NDGA.

2. The antioxidizing composition of claim 1, further comprising a phospholipid.

3. The antioxidizing composition as set forth in claim 2, wherein the weight ratio of phospholipid to antioxidant is 1/50 to 20/1.

4. The antioxidizing composition as set forth in claim 1, wherein the condensed phosphate is selected from pyrophosphate, acid pyrophosphate, tripolyphosphate, tetrapolyphosphate, pentapolyphosphate, metaphosphate and ultrapolyphosphate.

5. Antioxidizing composition as set forth in claim 4, wherein the phosphate is selected from tripolyphosphate, tetrapolyphosphate and pentapolyphosphate.

6. Antioxidizing composition as set forth in claim 5, wherein the phosphate is pentapolyphosphate.

7. Antioxidizing composition as set forth in claim 1, wherein the antioxidizing composition comprises 3 to 1200 parts by weight of condensed phosphate, and 0.6 to 50 parts by weight of citric acid, relative to 100 parts by weight of antioxidant.

8. Antioxidizing composition as set forth in claim 1, wherein the antioxidant composition comprises tocopherol, pentapolyphosphate and citric acid.

9. Antioxidizing composition as set forth in claim 1, wherein the antioxidant composition comprises tocopherol, lecithin, pentapolyphosphate and citric acid.

* * * * *